(12) United States Patent
Nørholmen et al.

(10) Patent No.: US 6,276,874 B1
(45) Date of Patent: Aug. 21, 2001

(54) MEANS AND METHOD FOR THE INSTALLATION OF SUBSEA CABLES

(75) Inventors: John Øivind Nørholmen, Lørenskog; Jan Erik Karlsen, Kolbotn; Knut Ivar Ekeberg, Oslo, all of (NO)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/233,121

(22) Filed: Jan. 19, 1999

(30) Foreign Application Priority Data

Jan. 19, 1998 (NO) .................................................. 19980230

(51) Int. Cl.⁷ ...................................................... F16L 1/12
(52) U.S. Cl. .................... 405/168.1; 405/168.2; 405/169; 405/190
(58) Field of Search ................ 405/168.1, 168.2, 405/168.3, 168.4, 169, 170, 171, 190, 191, 192; 166/338–343

(56) References Cited

U.S. PATENT DOCUMENTS

| | | | |
|---|---|---|---|
| 3,216,203 | * 11/1965 | Giraud et al. | 405/171 |
| 3,595,312 | * 7/1971 | Matthews, Jr. | 405/168.1 X |
| 3,650,114 | * 3/1972 | Neal | 405/168.1 |
| 3,754,404 | * 8/1973 | Moore | 405/168.1 X |
| 4,175,620 | * 11/1979 | Nolan, Jr. et al. | 405/169 X |
| 4,313,694 | * 2/1982 | Cox | 405/169 X |
| 4,443,129 | * 4/1984 | De Silvry et al. | 405/170 |
| 4,457,378 | * 7/1984 | Watkins | 405/169 X |
| 4,688,966 | * 8/1987 | Esparza | 405/169 |
| 4,725,088 | * 2/1988 | Mank | 296/90 |
| 4,808,034 | * 2/1989 | Birch | 405/195.1 |
| 4,854,781 | * 8/1989 | Sparks et al. | 405/224 |
| 4,906,137 | * 3/1990 | Maloberti et al. | 405/195.1 |

* cited by examiner

Primary Examiner—William Neuder
Assistant Examiner—Jong-Suk Lee
(74) Attorney, Agent, or Firm—Sughrue, Mion, Zinn, Macpeak & Seas, PLLC

(57) ABSTRACT

A subsea steep wave lock and guide mechanism (1) for elongated articles (2) such as cables, pipes and umbilicals provides a substantially horizontal inlet (6) for the article at seabed level and a substantially vertical flexible article outlet (4) leading to the steep wave. The lock and guide mechanism (1) includes a number of lockable/releasable gates (20–24) for restricting and defining allowable movements of the article in the horizontal as well as in the vertical direction.

9 Claims, 2 Drawing Sheets

MEANS AND METHOD FOR THE INSTALLATION OF SUBSEA CABLES

BACKGROUND OF THE INVENTION

The present invention relates to means and methods for installation of elongated articles from a surface vessel to a sea bed. It relates in particular to permanent installations and to the problem of preventing damage to an elongated article which is installed between a surface vessel and the sea bed. The elongated article may be a cable, an umbilical, a flexible pipe riser or the like.

A special technical problem is to provide a suitable transfer from a bottom laid static article (umbilical) to a dynamic article (umbilical) leading as a steep wave to a surface installation. One solution is described in our copending NO 961249 A (O Birkelund 3-1) by which the dynamic umbilical is secured to a bottom structure by means of a tether wire. This solution is—however—not suitable in all situations.

U.S. Pat. No. 3,216,203 relates to an arrangement for submarine conveyance of fluids through a flexible pipe line. The pipe line is assumed to have a positive buoyancy and it may be maintained at a desired depth by anchoring the pipe line with several pairs of cables to sea bed structures. This publication does, however, not give any hints to how a steep wave installation could be handled. With a steep wave installation, the elongated article will normally follow an S-curve configuration (lazy wave) between a substantially vertical outlet from a vessel and a substantially vertical installation on the sea bed. At a certain position between the vessel and the sea bed, the elongated article is suspended from buoyancy devices to create the flexible S-form.

At a lower position the elongated article is anchored to the sea bed. There is little risk of damaging the elongated article at the buoyancy device suspending positions. At the anchoring positions there are, however, transverse and in-line forces and potential uncontrolled shapes and configurations acting on the elongated article and these are difficult to cope with.

SUMMARY OF THE INVENTION

The object of the invention is to provide means for anchoring an elongated article in a position mentioned—over a long time—without damaging the article. The object is also to stabilize the configuration during the life of the installation in order to prevent interference with other elongated articles transversely and omnidirectionally. The main features of the invention are defined in the claims.

With the present invention, a reliable method and mechanism for locking and guiding an elongated article to a sea bed have been obtained. Also, a reduction of the forces and control of the configuration of the elongated article at the touch down point area has been acheived. The lock and guide mechanism is designed to be ROV friendly because of deep water requirements, and the arrangements provide minimum wear under all load (near, far, transverse) conditions.

BRIEF DESCRIPTION OF THE DRAWING

The above mentioned and other features and objects of the present invention will clearly appear from the following detailed description of embodiments of the invention taken in conjunction with the drawings, wherein.

DETAILED DESCRIPTION OF THE INVENTION

Figure 1:
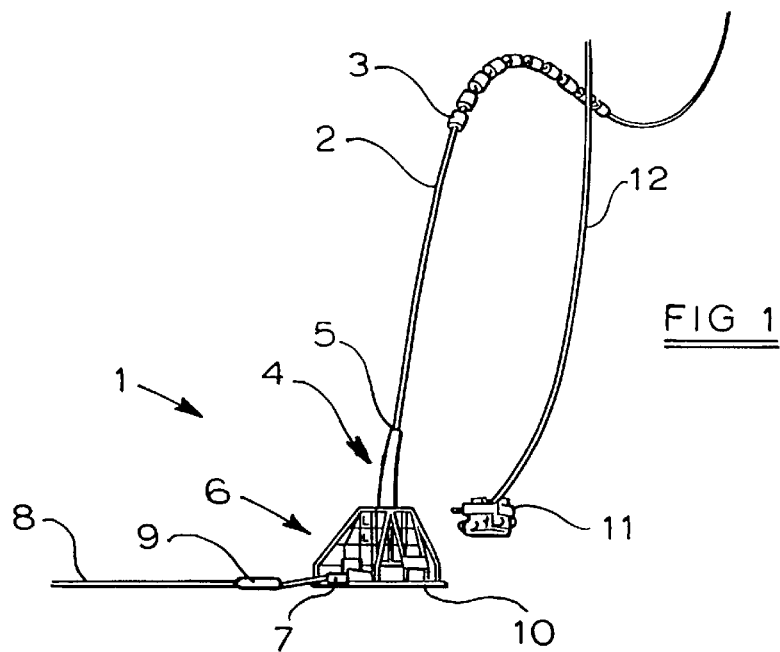
FIG. 1 is a perspective view of a lock and guide mechanism used for anchoring an elongated article to the sea bed in a steep wave configuration.

FIG. 1 schematically illustrates a lock and guide means 1 used for anchoring an elongated article 2 to the sea bed in a steep wave configuration. The article which is suspended vertically from a movable surface vessel (not shown) at sea level passes through an S-curve by means of buoyancy devices 3 to a substantially vertical outlet 4 from the lock and guide means 1. The article may pass through a BSR (bending strain reliever) 5 at the top of the lock means.

The lock means has a substantially horizontal inlet 6 for the article which can be a dynamical umbilical. The entrance of the article into the lock means 1 is controlled and stopped with a gate arrangement 7. The dynamic umbilical may be joined to a static umbilical 8 in a joint 9 resting on the sea bed. The lock means 1 is secured to a slab 10 of concrete having sufficient weight to prevent displacement. The installation steps and operations are controlled with an ROV 11 which is operated via an ROV-cable 12 leading to the surface vessel.

The lock means 1 include a number of lockable/releasable gates 20–24 for restricting and defining allowable movements of the article in the horizontal as well as in the vertical direction. There are a first 20 and a second 21 guide gate which defines the horizontal direction of the article as well as a first and a second restriction in the vertical direction. There is also a third guide gate 22 which is movable and defines a third restriction in the vertical direction. A fourth guide gate 23 is movable and defines a fourth restriction in the vertical direction. Finally a fifth gate or dock 24 which is part of the gate arrangement 7 restricts longitudinal displacements of the article 2 through the lock means when the article is provided with a clamp 25.

The third and the fourth guide gates 22 and 23 are vertically hinged to the first and/or the second gates 20, 21.

Figure 2:
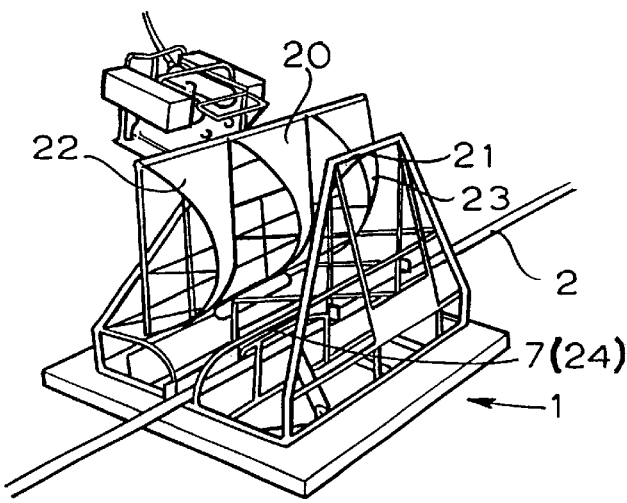
FIG. 2 is a perspective view of the lock and guide mechanism with the guide open and the elongated article laid straight through the guide.
Figure 3:
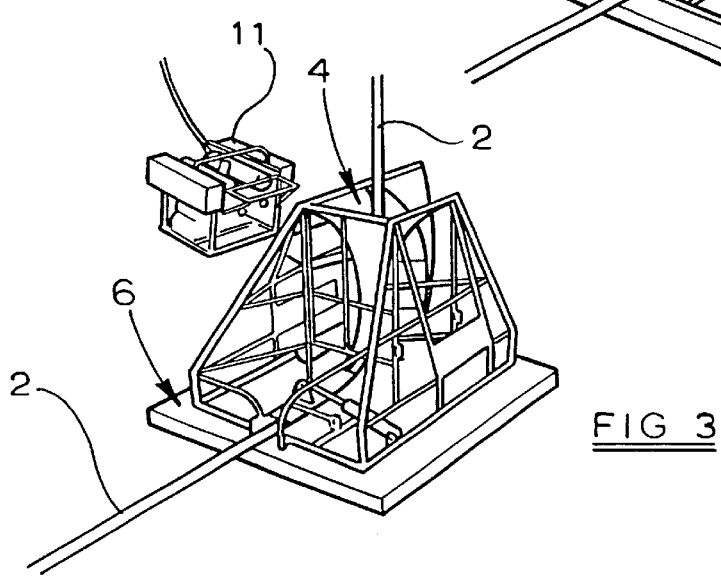
FIG. 3 is a perspective view of the lock and guide mechanism with the gate closed.

The installation takes place as follows:

In a first step the guide is open as illustrated in FIG. 2, and the elongated article 2 is laid straight through the guide. The next step is to close gate 22 by rotating it 90 degrees counterclockwise. This is illustrated in FIG. 3. At this stage the gate 7 can also be closed so that the dock 24 is in the correct position to receive the article clamp 25 at a later stage. The next step is to close gate 23 by rotating it clockwise 90 degrees. When this is done—with the ROV—the article 2 is enclosed within the four guide gates 20–23 at the top of the lock means 1. The gates 20–23 must have smooth surfaces and the outlet that they form may be a square as illustrated or have a rounded opening.

Figure 4:
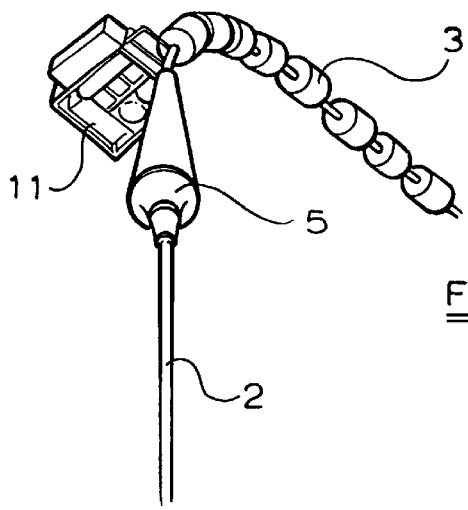
FIG. 4 is a perspective view of the bending strain reliever of the lock and guide mechanism hanging from the buoyancy devices.
Figure 5:
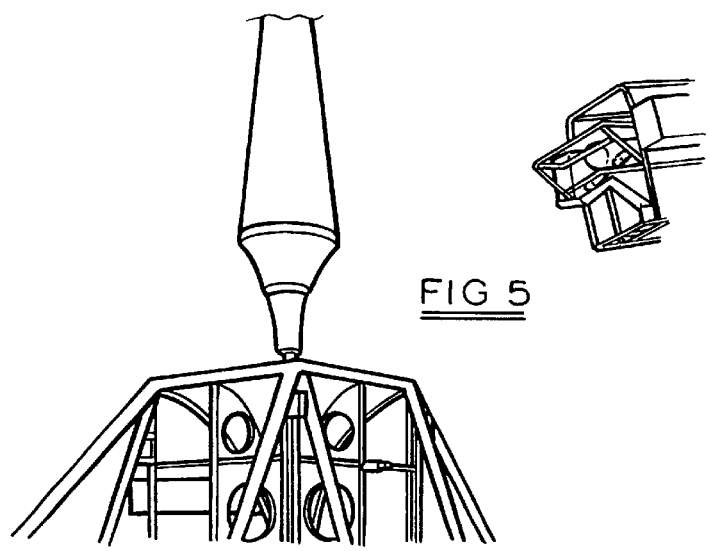
FIG. 5 is a perspective view of the bending strain reliever of the lock and guide mechanism released by the remote operated vehicle (ROV).
Figure 6:
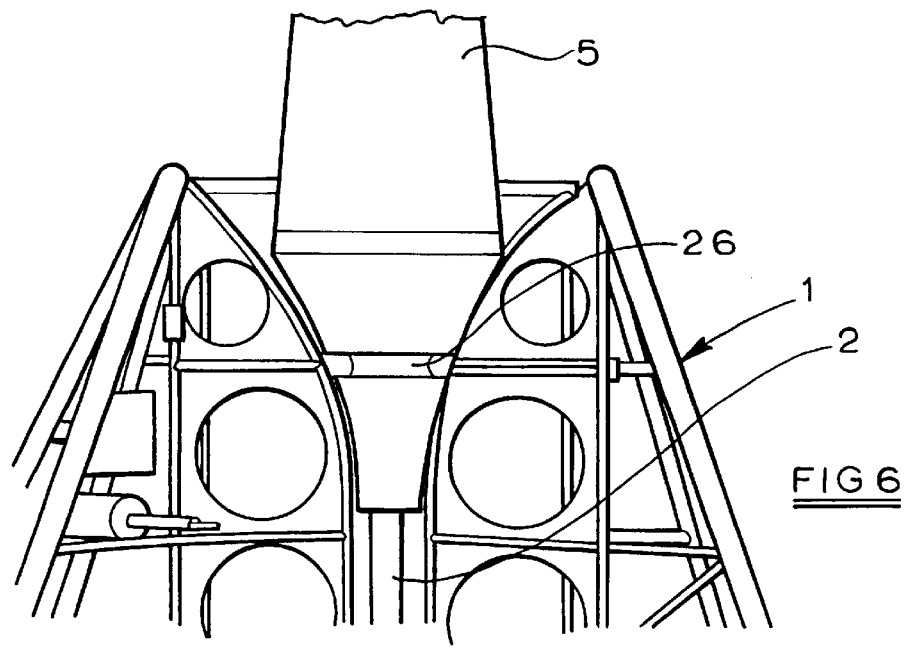
FIG. 6 is a perspective view of the bending strain reliever of the lock and guide mechanism fixed to the lock mechanism by a fixing mechanism.

The guide outlet 4 may be arranged to receive a BSR 5 as schematically illustrated in FIGS. 4–6. During the steps of closing the gates 20–23—and the gate 7 (24,25)—a BSR 5 may be hanging from the buoyancy devices as shown in FIG. 4, to be released by the ROV 11 and lowered as shown in FIG. 5 and fixed to the lock means 1 by fixing means 26 (FIG. 6).

The above detailed description of embodiments of this invention must be taken as examples only and should not be considered as limitations on the scope of protection.

What is claimed is:

1. An apparatus for installation of an elongated article from a surface vessel to a sea bed, said apparatus comprising:
    a sub-sea steep wave lock and guide means which provides a dynamic substantially horizontal inlet for the article at sea bed level and a substantially vertical flexible article outlet leading to a steep wave,
        wherein said lock and guide means includes a number of guide gates being movably lockable or releasable for restricting and defining allowable movements of the article in a horizontal and a vertical direction, and
        wherein at least some of said guide gates cooperate together for restricting and defining said allowable movements.

2. The apparatus according to claim 1, wherein said number of guide gates of said lock and guide means includes:
    a first and second guide gate which defines the horizontal direction of the article and a first and second restriction in the vertical direction,
    a third guide gate which is movable and defines a third restriction in the vertical direction,
    a fourth guide gate which is movable and defines a third restriction in the vertical direction, and
    a fifth gate which restricts longitudinal displacements of the article.

3. The apparatus according to claim 2, wherein the third and the fourth guide gates are vertically hinged to at least one of the first and the second gates.

4. The apparatus according to claim 2, wherein the fifth gate comprises a clamp fixed to the elongated article and a dock for the clamp.

5. The apparatus according to claim 1, wherein all the movable gates are operable with an ROV.

6. The apparatus according to claim 1, wherein the vertical outlet includes a bending strain reliever.

7. A method for steep wave installation of an elongated article using a lock and guide mechanism, from a surface vessel to a sea bed, said lock and guide mechanism including a horizontal inlet and a vertical outlet, the method comprising the steps of:
    arranging the article between a first and a second guide gate which define a horizontal direction of the article, and a first and a second restriction in a vertical direction,
    closing a third guide gate which is movable and defines a third restriction in the vertical direction,
    arranging the article into contact with said third gate,
    closing a fourth guide gate which is movable and defines a fourth restriction in the vertical direction, and
    closing a fifth gate which restricts longitudinal displacements of the article.

8. The method according to claim 7, wherein an ROV is used to one of close and open all the movable gates.

9. The method according to claim 7, further comprising the step of mounting a bending strain reliever at the vertical outlet of the lock.

\* \* \* \* \*